United States Patent
Fukunaga et al.

(10) Patent No.: US 12,544,819 B2
(45) Date of Patent: Feb. 10, 2026

(54) MANUFACTURING METHOD OF RECTANGULAR BATTERY CAN

(71) Applicant: DAIWA CAN COMPANY, Chiyoda-ku (JP)

(72) Inventors: Minoru Fukunaga, Sagamihara (JP); Kazuhiro Saeki, Sagamihara (JP); Yasushi Enoki, Sagamihara (JP)

(73) Assignee: DAIWA CAN COMPANY, Chiyoda-ku (JP)

(*) Notice: Subject to any disclaimer, the term of this patent is extended or adjusted under 35 U.S.C. 154(b) by 274 days.

(21) Appl. No.: 18/261,221

(22) PCT Filed: Jan. 7, 2022

(86) PCT No.: PCT/JP2022/000374
§ 371 (c)(1),
(2) Date: Jul. 12, 2023

(87) PCT Pub. No.: WO2022/163326
PCT Pub. Date: Aug. 4, 2022

(65) Prior Publication Data
US 2024/0066580 A1    Feb. 29, 2024

(30) Foreign Application Priority Data
Jan. 28, 2021  (JP) ................................ 2021-011967

(51) Int. Cl.
*B21D 22/20*    (2006.01)
*H01M 50/103*    (2021.01)

(52) U.S. Cl.
CPC .......... *B21D 22/20* (2013.01); *H01M 50/103* (2021.01)

(58) Field of Classification Search
CPC ........ B21D 22/20; B21D 22/21; B21D 22/26; B21D 22/28; B21D 51/2646; H01M 50/103
See application file for complete search history.

(56) References Cited

U.S. PATENT DOCUMENTS 5,823,041 A * 10/1998 McClung ........... B21D 51/2646
                                                        72/379.4
6,165,640 A    12/2000 Sugikawa
(Continued)

FOREIGN PATENT DOCUMENTS

JP    9-306439 A    11/1997
JP    4119612 B2    7/2008
(Continued)

OTHER PUBLICATIONS

JP 2015-197964A, Konishi et al. Nov. 2015.*
(Continued)

*Primary Examiner* — Edward T Tolan
(74) *Attorney, Agent, or Firm* — Oblon, McClelland, Maier & Neustadt, L.L.P.

(57) ABSTRACT

A method of manufacturing a rectangular battery includes: ironing the blank thereby forming an interim cup including an interim bottom whose area is larger than a bottom plate of the rectangular battery can, an inclined wall tilting upwardly formed continuously from each longitudinal end of the interim bottom, a short side wall formed continuously from the inclined wall, and a long side wall formed continuously from a curved corner formed on each lateral end of the interim bottom; deforming the interim cup such that each boundary between the interim bottom and the inclined wall is displaced toward a longitudinal end of the bottom plate of the rectangular battery can, and a width of the interim bottom is adjusted to a width of the bottom plate of (Continued)

the rectangular battery can; and ironing the short side and long side walls to reduce thicknesses of the short side and long side walls.

4 Claims, 8 Drawing Sheets

(56) References Cited

U.S. PATENT DOCUMENTS

| | | | | |
|---|---|---|---|---|
| 6,333,124 | B1* | 12/2001 | Moriwaki | H01M 50/1243 |
| | | | | 429/176 |
| 6,929,880 | B1 | 8/2005 | Mori et al. | |
| 6,946,221 | B2* | 9/2005 | Ueda | H01M 50/186 |
| | | | | 72/347 |
| 2023/0124823 | A1 | 4/2023 | Fukunaga et al. | |

FOREIGN PATENT DOCUMENTS

| | | |
|---|---|---|
| JP | 2013-143331 A | 7/2013 |
| JP | 2014-233755 A | 12/2014 |
| JP | 6193794 B2 | 9/2017 |
| WO | WO 2021/192622 A1 | 9/2021 |

OTHER PUBLICATIONS

JP 2007-260740A, Ozawa et al. Oct. 2007.*
JP 2019-166527A, Yamauchi et al. Oct. 2019.*
KR 20200134634A, Kim et al. Dec. 2020.*
International Search Report mailed on Mar. 8, 2022 in PCT/JP2022/000374 filed on Jan. 1, 2022 (citing references 2 & 17-20 therein, 2 pages).

* cited by examiner (a)

(b)

(a)

(b)

(a)

(b)

MANUFACTURING METHOD OF RECTANGULAR BATTERY CAN

TECHNICAL FIELD

This invention relates to a manufacturing method of a thin rectangular can adopted as a casing of a battery such as a lithium-ion secondary battery.

BACKGROUND ART

The rectangular cans of this kind can be loaded efficiently, and rigidity and radiation performance of the rectangular cans of this kind are excellent. Therefore, the rectangular cans of this kind are used commonly as battery cans. In order to produce the rectangular cans efficiently at a low cost, the rectangular cans are usually manufactured by drawing and ironing a metallic material such as an aluminum sheet. However, in the rectangular cans, lengths of a short side and a long side thereof are significantly different, and a depth thereof is very deep. For these reasons, it is difficult to reduce a thickness of peripheral walls of the rectangular can homogeneously compared to a case of forming a cylindrical can having a uniform shape. Especially, a corner as a boundary between a narrower wall and a wider wall serves as a resistance against a plastic flow of the material in a circumferential direction during ironing and drawing. Therefore, if the material is subjected to the ironing and the drawing excessively, cracks, wrinkles, and ruptures would be developed. In order to avoid such disadvantages, a processing amount in one cycle has to be reduced. Consequently, the number of cycles and a manufacturing speed are reduced thereby reducing productivity of the rectangular cans.

Attempts have been made to solve the above-explained problem as described in publications of Japanese Patent Nos. 4119612 and 6193794. In order to improve a high energy density and a pressure withstanding strength by reducing a thickness and a weight of a battery case, according to the teachings of Japanese Patent No. 4119612, a battery case material as a metallic sheet undergoes deep drawing to form a first intermediate cup element having a substantially elliptical shape. The first intermediate cup element undergoes re-drawing successively in plural stages to form a second intermediate cup element having a substantially elliptical shape which is smaller in minor-axis-diameter to major-axis-diameter ratio. Thereafter, the second intermediate cup element undergoes DI processing in which the drawing and the ironing are executed simultaneously so as to form a prismatic battery case having a substantially rectangular cross-section wherein a thickness of a shorter-side plate is made larger than a thickness of a longer-side plate. In the prismatic battery case having a substantially rectangular cross-section, dimensions or areas of the shorter-side plate and the longer-side plate are significantly different from each other. In addition, a corner between the shorter-side plate and the longer-side plate is bent at a substantially right angle, and this makes a plastic flow of the material uneven. For these reasons, cracks and wrinkles would be developed in the shorter-side plate, and the shorter-side plate would be warped. That is, it is difficult to process the prismatic battery case stably. In order to avoid such disadvantage, according to the teachings of Japanese Patent No. 4119612, a thickness of the shorter-side plate is maintained thicker than those of other sections.

According to the teachings of Japanese Patent No. 6193794, slant walls are formed around (on four sides of) a rectangular bottom by a first drawing work and a second drawing work as a re-drawing such that a diameter of an intermediate product is reduced toward the bottom side. Specifically, at the first drawing work, an aluminum alloy plate is drawn to form a first prismatic body in which the slant walls are formed partially on all of side walls such that a diameter of the first prismatic body is reduced from the side walls toward the bottom. Then, at the second drawing work, the first prismatic body is re-drawn to form a second prismatic body in which an outer size is reduced while maintaining the slant walls. Thereafter, the second prismatic body is drawn to be shaped into a battery case in which thicknesses of the side walls are reduced less than 60% of an initial thickness and the slant walls are shaped into the side walls erected perpendicular to the bottom. Thus, according to the teachings of Japanese Patent No. 6193794, the slant walls are formed between the side walls of four sides and the bottom by the first drawing work and the second drawing work. Therefore, a distortion angle between the bottom and the side walls is reduced narrower than a right angle so that a deformation resistance of the material is reduced. For this reason, formability of the battery can may be improved while ensuring accuracies of a wall thickness and configurations.

SUMMARY OF INVENTION

Technical Problem to be Solved by the Invention

In a case of forming a cylindrical body by drawing a flat blank, a portion to be shaped into a peripheral wall or a side wall is shrunk. By a first drawing step and a second drawing step described in Japanese Patent No. 4119612, the material is flown in a circumferential direction (i.e., in a lateral direction perpendicular to a drawing direction) due to shrinkage. However, an area of a long side wall and an area of a short side wall are significantly different from each other, and in addition, a boundary between the long side wall and the short side wall is bent. Therefore, it is difficult for the material to flow across the bent section. For this reason, a thickness of the short side wall would be increased, and in addition, the material would concentrate on a portion of the long side wall close to the short side wall (i.e., to the bent section) thereby increasing a thickness of the above-mentioned portion. The bent section is bent sharply (that is, an angle of the bent section is reduced toward a right angle) with the progress of the drawing, and consequently the flow of the material is further restricted thereby increasing the thickness of the portion close to the bent section. The resistance (i.e., deformation resistance) of the material against the re-drawing and the ironing increases with an increase in the thickness of a processing site. Therefore, the deformation resistance is increased at the site where the thickness thereof is increased by the concentration of the material such as the portion close to the bent section and the short side wall. Specifically, deformation resistance is increased most significantly immediately before the commencement of deformation. That is, according to the method described in Japanese Patent No. 4119612, the pressure withstanding strength may be increased by increasing the thickness of the short side wall. However, a forming load is increased during execution of the re-drawing and the ironing. Consequently, the corner between the bottom and the side walls and the side walls are stretched strongly thereby developing a crack and a rupture. Thus, in order to reduce the number of processes by increasing a drawing amount and an ironing amount thereby improving the productivity, the method described in Japanese Patent No. 4119612 has to be improved to reduce the deformation resistance of the bent section and the short side wall.

Whereas, in the method described in Japanese Patent No. 6193794, the slant walls are formed on the four sides of the bottom by the drawing works to reduce the deformation resistance of the portion at which the slant walls are formed. However, the drawing work is applied to the four side walls having sharp corners (or edge) at boundaries between the side walls. Consequently, the slant walls would get wrinkled, and the wrinkles would remain on the side walls to lose quality. In addition, according to the teachings of Japanese Patent No. 6193794, the bottom enclosed by the slant walls serves as a bottom of the final product, and the prismatic body expanding upwardly from the bottom is formed during the process of manufacturing. Specifically, the prismatic body is shaped into a final product sequentially while being held by a finger to be transported to a next processing site. To this end, the prismatic body is required to stand erect when released from the finger. However, in the prismatic body described in Japanese Patent No. 6193794, an area of the bottom is rather narrow. In addition, the prismatic body expands upwardly from the bottom. Thus, the prismatic body is too unstable to stand upright by itself. Therefore, the prismatic body would fall or incline, or would be displaced to cause a jamming during the process of manufacturing.

The present invention has been conceived noting the above-explained technical problems, and it is therefore an object of the present invention to provide a method of manufacturing a rectangular battery can efficiently without reducing accuracy.

Means for Solving the Problem

In order to achieve the above-explained objective, according to the present invention, there is provided a manufacturing method of a rectangular battery can having a rectangular cross-section parallel to a bottom plate by drawing and ironing a blank of aluminum alloy. The manufacturing method comprises: a first step of ironing the blank thereby forming an interim cup including an oval or a rectangular interim bottom whose area is larger than the bottom plate of the rectangular battery can, an inclined wall tilting obliquely upwardly that is formed continuously from each longitudinal end of the interim bottom, a short side wall that is formed continuously from the inclined wall, and a long side wall that is formed continuously from a curved corner formed on each lateral end of the interim bottom; a second step of drawing or drawing and ironing the interim cup thereby deforming the interim cup such that each boundary between the interim bottom and the inclined wall is gradually displaced toward a longitudinal end of the bottom plate of the rectangular battery can, and that a width of the interim bottom in a direction along a minor axis is adjusted to a width of the bottom plate of the rectangular battery can in a direction along a short side; and a third step of ironing or drawing and ironing the short side wall and the long side wall that is executed after the second step thereby thinning thicknesses of the short side wall and the long side wall.

According to the present invention, the inclined wall of the interim cup may be inclined at a predetermined angle from a line of origin extending closer to the short side wall than the longitudinal end of the bottom plate of the rectangular battery can. The line of origin may extend closer to the short side wall than the longitudinal end of the bottom plate of the rectangular battery can, and closer to the longitudinal end of the bottom plate of the rectangular battery can than an intermediate portion between the longitudinal end of the bottom plate of the rectangular battery can and the short side wall. The predetermined angle may be set within a range from 25 to 45 degrees, and the inclined wall may be joined to the short side wall through a smooth curve.

According to the present invention, a length of the interim bottom in a direction along a major axis may be longer than a length of the rectangular battery can in a direction along a long side, and the width of the interim bottom in the direction along the minor axis may be wider than a width of the rectangular battery can in the direction along the short side.

According to the present invention, the second step may be executed to eliminate the inclined wall by bending the inclined wall at a right angle with respect to the bottom plate thereby shaping the inclined wall into a part of the short side wall, and eliminate the curved corner by bending the long side wall thereby shaping the curved corner into a corner bent at a right angle with respect to the bottom plate.

Advantageous Effects of Invention

According to the present invention, the blank is drawn at the first step thereby forming the interim cup having the inclined wall formed on each longitudinal end of the oval or a rectangular interim bottom, and the curved corner formed on each lateral end (i.e., on both ends) of the interim bottom. In the interim cup, a portion to be bent at a right angle or narrower, that is, a portion which may hinder a material flow and increase a deformation resistance does not exist all around the interim bottom that is larger than the bottom plate of the rectangular can as a final product. Therefore, the rectangular can may be formed without developing cracks and ruptures. In the interim cup, the inclined walls are formed only on both longitudinal ends of the interim bottom, and the interim bottom is larger than the bottom plate of the final product. Therefore, the interim cup is allowed to stand erect stably during transportation to the subsequent processing step. For this reason, the rectangular can may be manufactured efficiently without causing a jamming. That is, productivity of the rectangular can may be improved.

As described, according to the present invention, each of the inclined walls is inclined obliquely upwardly from each longitudinal end of the interim bottom. Specifically, the line of origin of the inclined wall extends slightly closer to the short side wall than the longitudinal end of the bottom plate of the rectangular can. Therefore, when drawing or drawing and ironing the interim cup at the second step, the processing or deformation starts from the long side walls joined to the interim bottom through the curved corners, and the processing or deformation of the inclined wall and the short side walls starts thereafter. That is, the inclined walls joined to the short side walls and the short side walls are not clamped tightly in the initial phase of the processing or deformation of the long side walls that is larger than the short side walls. In other words, a bonding force is weak. Accordingly, the material is allowed to flow smoothly at the corner (or bent section) between the long side wall and the short side wall. For this reason, a forming load at the commencement (i.e., at an initial motion) of the processing can be reduced. In addition, the rectangular can may be formed without developing cracks and ruptures. Furthermore, a processing amount per step may be increased.

In addition, the die comprises an entry section that gradually introduce a processing object, and a land section that is formed continuously from the entry section to govern dimensions and an outer shape of the object. According to the present invention, each of the inclined walls is inclined upwardly at an angle steeper than 25 degrees. Therefore, most (upper) part of the inclined walls will not come into contact with the die when the interim bottom and the curved section joined to the short side wall starts coming into contact with the entry section of the die. For this reason, timings to commence the processing of the inclined wall and the processing of the short side wall may be delayed certainly with respect to the processing of the long side wall and the processing of the curved corner. Although a height of the short side wall is increased by the inclined wall, according to the present invention, the inclination angle of the inclined wall is narrower than 45 degrees so that the height of the short side wall is substantially equalized to the height of the long side wall. Consequently, the interim cup is shaped into a stable shape so that a risk of falling or tilting is reduced during transportation to the subsequent processing step. That is, a risk of jamming is reduced. In addition, a difference between the height of the long side wall and the height of the short side wall (i.e., a difference between ear heights) is reduced to eliminate a portion projecting significantly upwardly. Therefore, it is not necessary to install a stripper finger to withdrawn the interim cup from the die at a higher level at which the interim cup comes into contact therewith. In other words, the interim cup withdrawn from the punch is allowed to drop from a lower level to reduce a risk of falling. Thus, a cause of the jamming such as falling of the interim cup may be eliminated.

DESCRIPTION OF EMBODIMENT(S)

Figure 1:
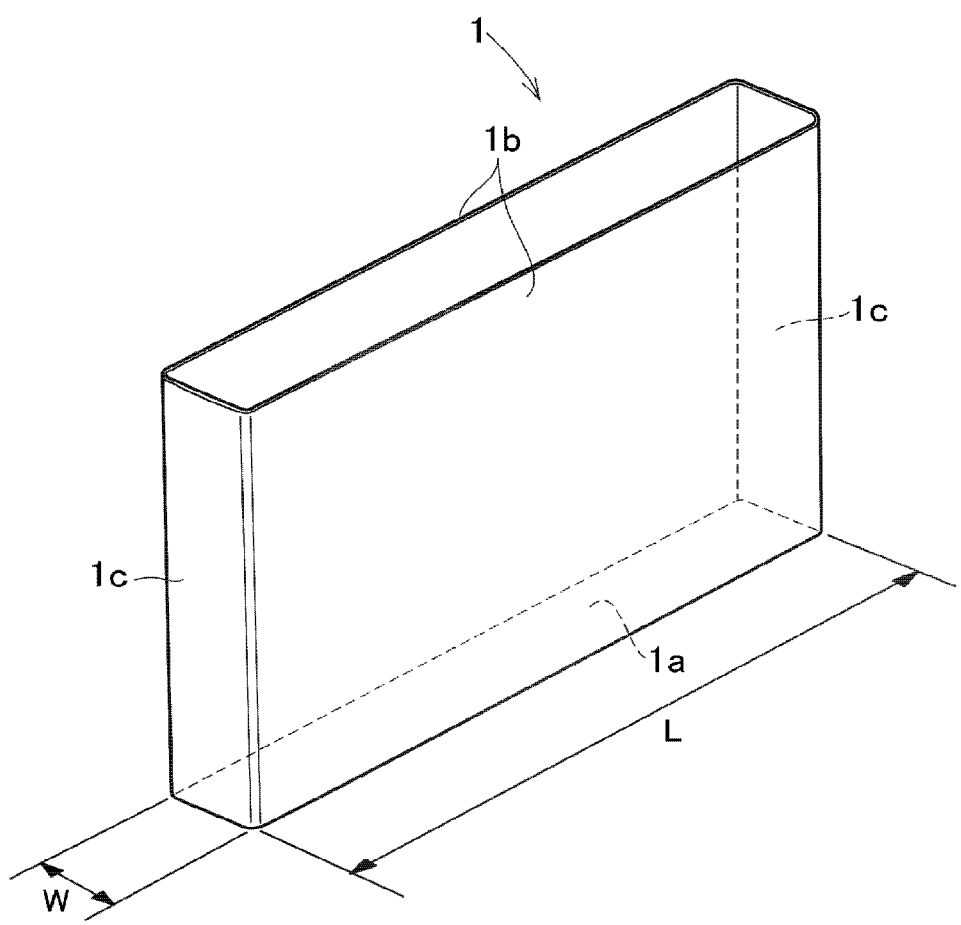
FIG. 1 is a perspective view showing one example of the rectangular battery can according to the present invention.

First of all, here will be explained one example of a rectangular battery cell manufactured by the method according to the exemplary embodiment of the present invention with reference to FIG. 1. As illustrated in FIG. 1, the rectangular battery can (hereinafter simply referred to as rectangular can) 1 has a rectangular cross-section parallel to a bottom plate 1a. A width of a long side wall 1b is significantly wider than a width of a short side wall 1c, and the bottom plate 1a is formed integrally with the side walls 1b and 1c to form a bottom section. In order to ensure a rigidity and an air-tightness and to reduce a manufacturing cost, the rectangular can 1 is manufactured by drawing and ironing a material such as a metallic sheet (e.g., an aluminum alloy sheet).

Figure 2:
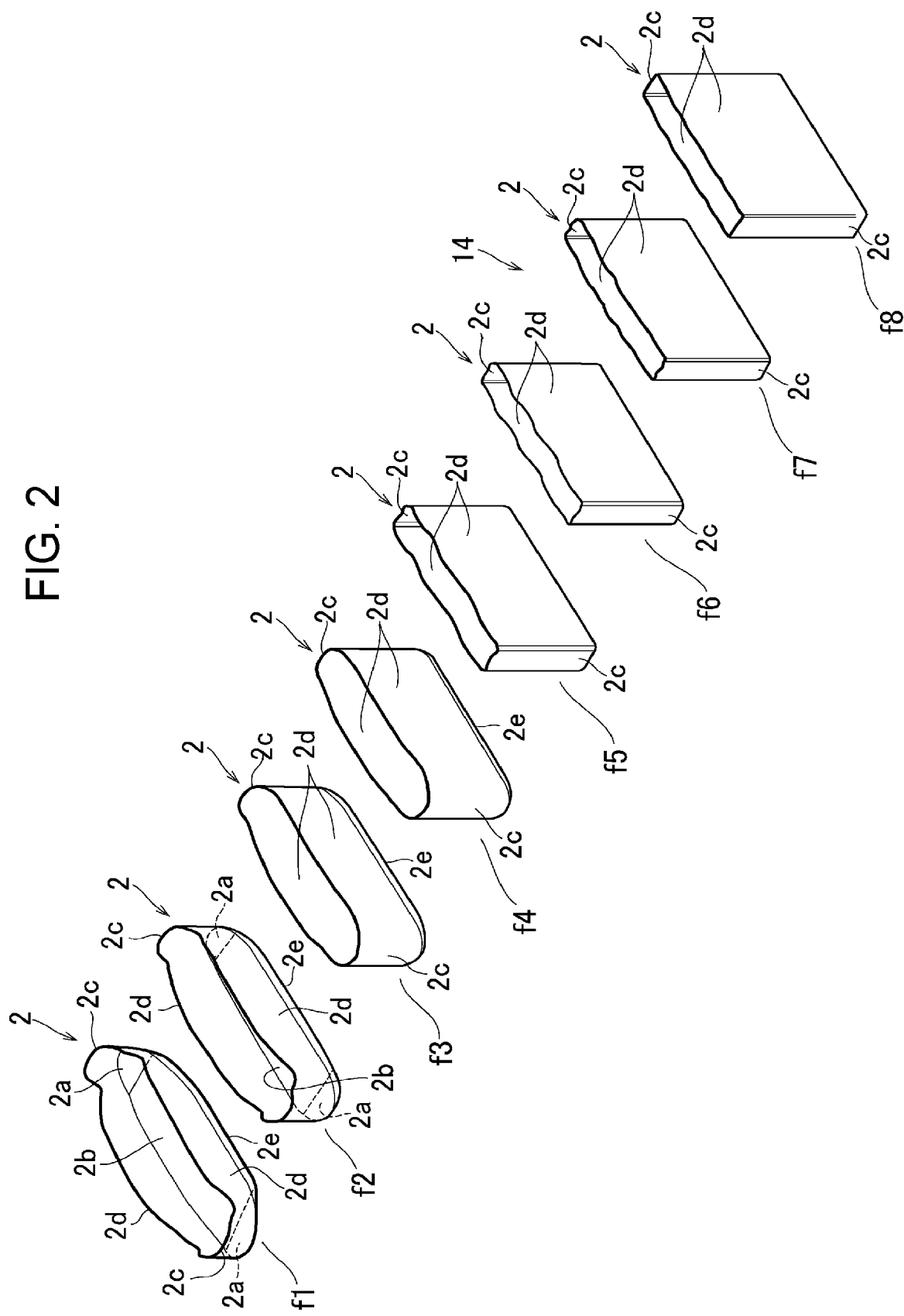
FIG. 2 is an explanatory illustration showing one example of a process of forming an interim cup by the method according to the present invention.

Turning to FIG. 2, there is shown a change in a shape of the rectangular can 1 being manufactured by the method according to the present invention. At a first step, an interim cup 2 is formed by drawing a blank. As illustrated in FIG. 1, the rectangular can 1 to be manufactured has a rectangular cross-section. Therefore, in order to reduce an amount of scrap as much as possible, an oval blank is most preferable to form the rectangular can 1. At the first step, for example, the interim cup 2 may be punched out of the blank by a die (not shown) to be dropped. Otherwise, the interim cup 2 may also be lift up together with a punch (not shown) to be returned to a path line to a subsequent step.

Figure 3:
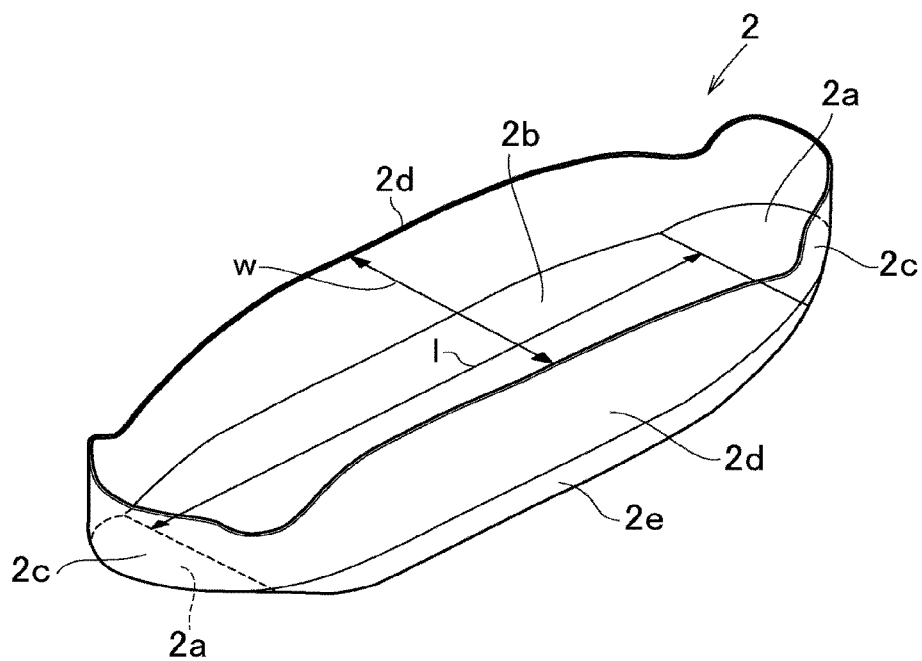
FIG. 3 is a perspective view showing one example of the interim cup formed by a first step.
Figure 4:
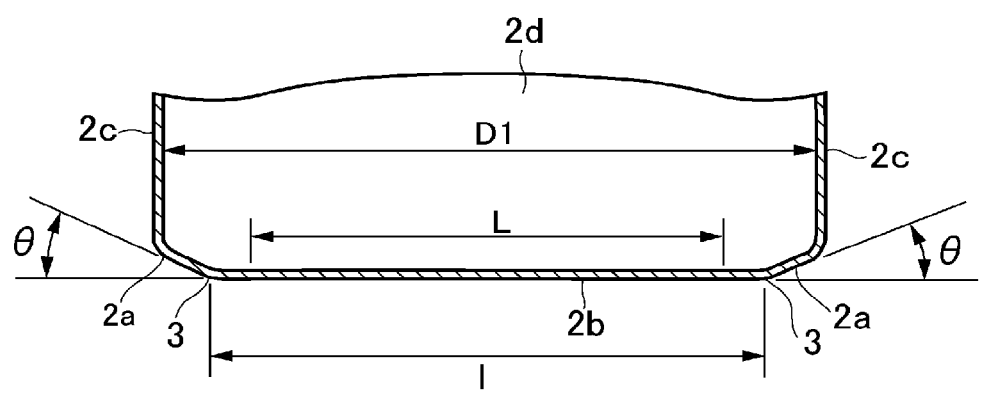
FIG. 4 (a) is a cross-sectional view showing a longitudinal cross-section of the interim cup, and FIG. 4 (b) is a cross-sectional view showing a longitudinal cross-section of one example of an interim cup in which an inclined wall is not formed.
Figure 4:
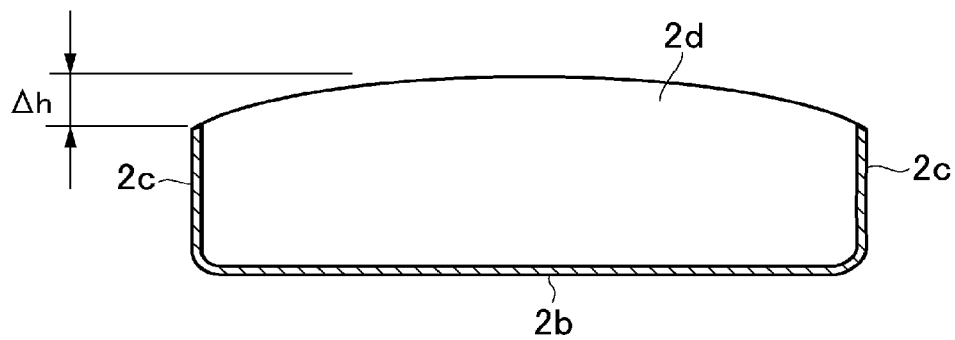

One example of the configuration of the interim cup 2 is shown in FIGS. 3 and 4 in more detail. A bottom of the interim cup 2 has an oval or elliptical shape viewed from the top, and as illustrated in FIG. 4 (a) as a longitudinal cross-sectional view, an inclined wall 2a tilting obliquely upwardly at a predetermined angle is formed from each longitudinal end of an interim bottom as the bottom of the interim cup 2. The interim bottom 2b is formed between the inclined walls 2a, and according to the exemplary embodiment of the present invention, the interim bottom 2b has an oval or elliptical shape. Specifically, a length l of the interim bottom 2b in the longitudinal direction (i.e., a length along the long side) is longer than a length L of the rectangular can 1 as a final product in the longitudinal direction, and a width w of the interim bottom 2b in the width direction (i.e., a length along the short side) is wider than a width w of the rectangular can 1. That is, an area of the interim bottom 2b is wider than an area of the bottom plate 1a of the rectangular can 1 so that the interim cup 2 is allowed to stand erect. Specifically, an outline (i.e., a profile) of a tip of the inclined wall 2a (opposite to the interim bottom 2b) is rounded elliptically, and a short side wall 2c extends upwardly from the rounded edge of the inclined wall 2a substantially perpendicular to the interim bottom 2b. That is, the short side wall 2c is a curved wall surrounding the tip of the inclined wall 2a approximately within 180 degrees in a circumferential direction, and the inclined wall 2a is formed between the short side wall 2c and the interim bottom 2b such that a bend angle (or a curvature) between the short side wall 2c and interim bottom 2b is made wider than the right angle (i.e., an obtuse angle). Specifically, the tip of the inclined wall 2a is joined to the short side wall 2c through a smooth curve.

Whereas, a long side wall 2d extends upwardly along the long side of the interim bottom 2b (i.e., on each lateral end of a minor axis) substantially perpendicular to the interim bottom 2b, and a curved corner 2e that is curved smoothly is formed between the long side wall 2d and the interim bottom 2b. Specifically, the curved corner 2e extends partially into a side wall of the inclined wall 2a. A curvature radius of the curved corner 2e is longer than a curvature radius of a corner of the rectangular can 1 as a final product between the bottom plate 1a and the long side wall 1b so that the long side wall 2d is joined smoothly and mildly into the interim bottom 2b.

Here will be explained the inclined wall 2a in more detail. The inclined wall 2a expands at an angle from the interim bottom 2b to be shaped into the short side wall 1c and each end of the long side wall 1b in the longitudinal direction of the rectangular can 1 as a final product. Specifically, the inclined wall 2a expands from a line of origin 3 as a boundary of the interim bottom 2b obliquely upward toward the short side wall 2c. As illustrated in FIG. 4 (a), the line of origin 3 extends closer to the short side wall 2c than an end portion of the rectangular can 1 as a final product in the longitudinal direction, and closer to the aforementioned end portion than an intermediate portion between the aforementioned end portion and the short side wall 2c. Given that a clearance between the short side walls 2c (i.e., a major axis of the oval interim cup 2) is D1, a clearance between the end portion of the rectangular can 1 in the longitudinal direction and the short side wall 2c may be expressed as:

$(D1-L)/2$, and a dimension ΔI to the intermediate portion of the above-mentioned clearance may be expressed as:

$\Delta I = \{(D1-L)/2\}/2$.

A distance from the end portion of the rectangular can 1 as a final product in the longitudinal direction to the line of origin 3 of the inclined wall 2a is shorter than ΔI (>0). A section between the interim bottom 2b and the inclined wall 2a is curved smoothly without creating an edge. Therefore, the line of origin 3 may be drawn along an outline of the aforementioned curved section extending adjacent to the interim bottom 2b, or drawn to extend through a center of the aforementioned curved section.

As illustrated in FIG. 4 (a), the inclined wall 2a is an intermediate planar section (i.e., a flat section) having a straight longitudinal cross-section that expands between the line of origin 3 and the short side wall 2c. Instead, the intermediate planer section may also be curved slightly. That is, a curvature radius of the inclined wall 2a is short in the vicinity of the line of origin 3 and an end side in the vicinity of the short side wall 2c. Whereas, a curvature radius of the intermediate planer section is substantially infinity and hence longer than the above-mentioned curvature radii. Here it is to be noted that the curvature radius discussed herein is a curvature radius of the longitudinal cross-section shown in FIG. 4 (a).

An inclination angle Θ of the inclined wall 2a (between the inclined wall 2a and an extension of the interim bottom 2b) is set between 25 and 45 degrees, inclusive. Therefore, when re-drawing or drawing and ironing the interim cup 2, timings to commence the processing of the inclined wall 2a and the processing of the short side wall 2c may be delayed certainly with respect to the processing of the long side wall 2d and the processing of the curved corner 2e. In addition, the interim cup 2 is allowed to stand erect stably. In the case that the inclined wall 2a is curved slightly, the inclination angle Θ of the inclined wall 2a may be set to an angle of tangent at the center of the longitudinal cross-section shown in FIG. 4 (a). For example, the inclined wall 2a may be formed using a drawing punch (not shown) having an inclining section to form the inclined wall 2a into a desired shape.

Given that the interim cup 2 is formed by drawing a blank of aluminum alloy, the material tends to concentrate in the short sides (on both sides in the longitudinal direction). Consequently, heights of the short side walls 2c (from the interim bottom 2b: ear height) would be lower than heights of the long side walls 2d. According to the exemplary embodiment of the present invention, however, the short side walls 2c are lifted by forming the inclined walls 2a so that the heights of the short side walls 2c from the interim bottom 2b (i.e., the ear heights) are raised. Therefore, as illustrated in FIG. 4 (a), heights of the long side walls 2d and heights of the short side walls 2c are substantially equalized to each other. FIG. 4 (b) shows a longitudinal cross-section of the interim cup 2 according to a comparison example in which the inclined walls 2a are not formed. In this case, the material concentrates on both ends in the longitudinal direction due to flow of the material in the circumferential direction, and hence the processing will not progress smoothly. Therefore, the ear height will not be increased and a relatively large gap Δh is created between the height of the short side wall 2c and the height of the long side wall 2d.

During execution of the drawing and the drawing/ironing multiple times consecutively, the interim cup 2 fitted onto a die is withdrawn therefrom by a stripper finger (neither of which are shown). Specifically, the stripper finger is fixed to a position at which an upper end of the short side wall 2c whose thickness is still thick comes into contact. Therefore, the short side wall 2c is brought into engagement with the stripper finger by raising the punch, and the interim cup 2 is withdrawn downwardly from the punch by further raising the punch. If the height of the short side wall 2c is short as illustrated in FIG. 4 (b) and the stripper finger is installed at a lower level in accordance with the height of the short side wall 2c, an upper end of the long side wall 2d would collide with the stripper finger while the interim cup 2 is transported on the path line. If the stripper finger is installed at a higher level to avoid such interference, the interim cup 2 would be withdrawn from the punch at a higher place. Consequently, the interim cup 2 dropping from the punch would fall or displaced. Whereas, in the case that the height of the short side wall 2c is equalized with the height of the long side wall 2d as illustrated in FIG. 4 (a), it is not necessary to install the stripper finger at a higher level. In this case, therefore, the interim cup 2 withdrawn from the punch is allowed to drop from a lower place to reduce a risk of falling and displacement. In addition, according to the exemplary embodiment of the present invention, the gap Δh may be reduced so that the interim cup 2 is shaped into a substantially complete cuboid. Therefore, the interim cup 2 is brought into a self-standing condition to avoid a jamming due to falling of the interim cup during transportation to the subsequent processing step.

The interim cup 2 thus formed at the first step is then drawn and ironed multiple times at a second step to be shaped into the rectangular can 1. A change in the shape of the interim cup 2 at the first step and the second step are shown in FIG. 2. In FIG. 2, f1 represents the first step, and f2 to f8 represent subsequent steps of the second step. As illustrated in FIG. 2, each part of the interim cup 2 is deformed (i.e., drawn) and the side walls 2c and 2d are ironed to be thinned. Consequently, each corner of the interim cup 2 is gradually flexed to a right angle, and a width and a length of the interim bottom 2b are adjusted to desired width and length of the bottom plate 1a of the rectangular can 1. Specifically, as the conventional drawing and the drawing/ironing, the interim cup 2 is installed on a die D, and a deformation force and an ironing force are applied to the interim cup 2 by pushing a punch downwardly into the die D.

Figure 5:
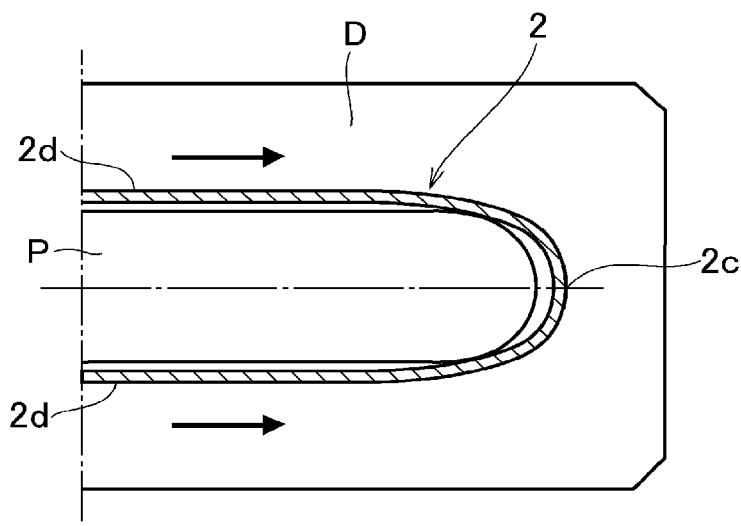
FIG. 5 is a partial cross-sectional view showing a cross-section of the interim cup in a situation where a drawing and ironing are applied thereto at a second step, in which FIG. 5 (a) shows a horizontal cross-section of the interim cup, and FIG. 5 (b) shows a longitudinal cross-section of the interim cup.
Figure 5:
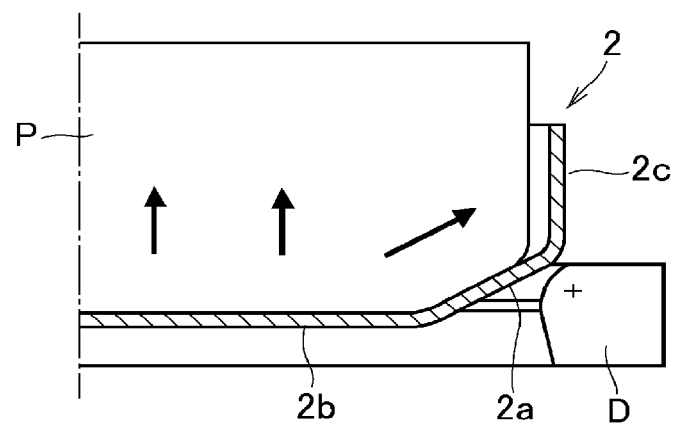

Conditions of the interim cup 2 at the second step are schematically shown in FIGS. 5 (a) and 5 (b). An opening of the die D is designed to reduce the length and the width of the interim cup 2 formed at the previous step to desired values. Whereas, a length of the interim bottom 2b is shorter than the clearance between the short side walls 2c (i.e., the length of the interim cup 2), and a width of the interim bottom 2b is narrower than the clearance between the long side walls 2d (i.e., the width of the interim cup 2). Therefore, the interim bottom 2b of the interim cup 2 installed on the die D slightly falls into the die D, and the curved corners 2e on both sides come into contact with an opening edge of the die D. As described, according to the exemplary embodiment of the present invention, each of the inclined walls 2a is inclined upwardly at an angle equal to or steeper than 25 degrees from the interim bottom 2b. Therefore, the inclined walls 2a and the short side walls 2c formed upwardly from the inclined walls 2a are isolated from the die D. The inclined walls 2a and the short side walls 2c are maintained to be isolated from the die D even immediately after the punch P is moved downwardly at the commencement of the processing of the interim cup 2. Accordingly, the long side walls 2d are processed prior to processing the short side walls 2c. That is, the processing of the long side walls 2d and the processing of the curved corners 2e extending downwardly therefrom are commenced without holding the inclined walls 2a and the short side walls 2c. Therefore, the material is allowed to flow smoothly in the directions indicated by arrows in FIGS. 5 (a) and 5 (b). Specifically, in the long side walls 2d, the flow of the material is expedited in the circumferential direction toward the short side walls 2c so that a forming resistance is reduced. In other words, a forming load at the commencement (i.e., at an initial motion) of the processing can be reduced. Therefore, development of cracks and ruptures may be prevented certainly. Otherwise, a forming amount (or a processing amount) at each processing step may be increased to improve the processing efficiency, and to reduce the number of processing steps.

Figure 6:
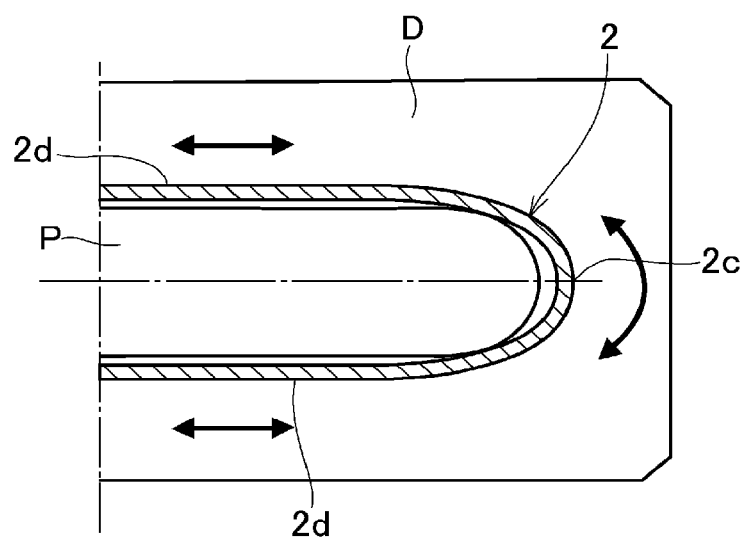
FIG. 6 is a partial cross-sectional view showing a cross-section of the interim cup in which an inclined wall is not formed in a situation where a drawing and ironing are applied thereto at the second step, in which FIG. 6 (a) shows a horizontal cross-section of the interim cup, and FIG. 6 (b) shows a longitudinal cross-section of the interim cup.
Figure 6:
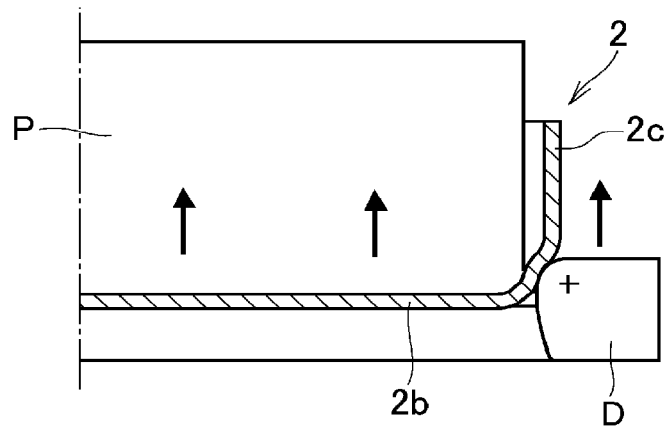

Conditions of the interim cup 2 according to the comparison example in which the inclined walls 2a are not formed at the second step are shown in FIGS. 6 (a) and 6 (b). In FIGS. 6 (a) and 6 (b), flow directions of the material are also indicated by arrows. Given that the inclined walls 2a are not formed, the drawing and ironing are commenced simultaneously all around the bottom side of the interim cup 2. Specifically, as illustrated in FIG. 6 (b), each portion of the interim bottom 2b in the vicinity of the short side is pinched between the punch P and the die D simultaneously with the commencement of the processing. Consequently, the flow of the material is hindered at the above-mentioned portions. In addition, as indicated in FIG. 6 (a), the material tends to flow from the short side walls 2c toward the long side walls 2d. As a result, the flow of the material in the circumferential direction is restricted and the forming resistance is increased. For these reasons, it is necessary to increase the forming force.

Figure 7:
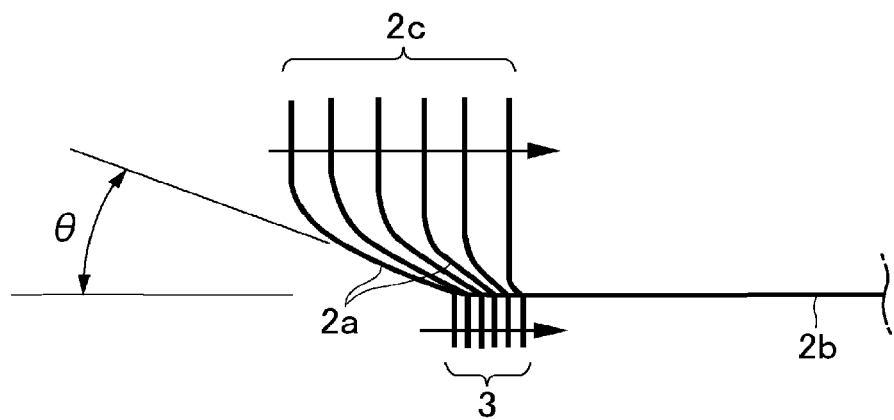
FIG. 7 is an explanatory diagram showing the inclined wall being deformed by the drawing and the ironing.

The interim cup 2 formed at the first step is drawn and ironed to reduce the length and the width of the interim bottom 2b, and to reduce the thicknesses of the short side walls 2c and the long side walls 2d thereby increasing the heights of those side walls gradually. Consequently, the interim cup 2 is shaped into a long and thin rectangular shape. One example of a change in the shape of the interim cup 2 in this situation is shown in FIG. 2. Specifically, a leading end section of each of the inclined walls 2a is drawn vertically with respect to the interim bottom 2b to be shaped into a part of the short side wall 2c. Consequently, an inclination angle Θ of the inclined wall 2a is gradually increased, and the line of origin 3 of the inclined wall 2a is gradually displaced toward the short side of the bottom plate 1a of the rectangular can 1. Such change in the inclined wall 2a is shown in FIG. 7. In FIG. 7, positions of the line of origin 3 are indicated by short straight lines.

The inclined wall 2a being deformed as illustrated in FIG. 7 is eventually bent at a substantially right angle to be shaped into a corner between the bottom plate 1a and the short side wall 1c (or into a curved section at which a curvature is large and a curvature radius is short) of the rectangular can 1. That is, the inclined wall 2a will be eliminated eventually. In the initial phase of the processing, the inclination angle Θ of the inclined wall 2a still falls within a range from 25 to 45 degrees. However, in a situation where the interim cup 2 is shaped into the rectangular can 1 to a certain extent, the inclination angle Θ of the inclined wall 2a exceeds 45 degrees. When the inclination angle Θ exceeds 45 degrees, a curvature radius (i.e., a length of arc) of the curved corner 2e between the long side wall 2d and the interim bottom 2b is reduced to be shorter. Consequently, a delay in the processing of the inclined wall 2a is reduced so that the processing of the short side wall 2c and the processing of the long side wall 2d are commenced substantially simultaneously. However, in the situation where the interim cup 2 is processed to the above-explained shape, the interim cup 2 will be subjected mainly to the ironing at the subsequent steps. Therefore, the flow of the material in the circumferential direction is reduced. For this reason, the forming resistance or the forming force at an initial motion can be reduced even if the inclined wall 2a is almost eliminated.

Figure 8:
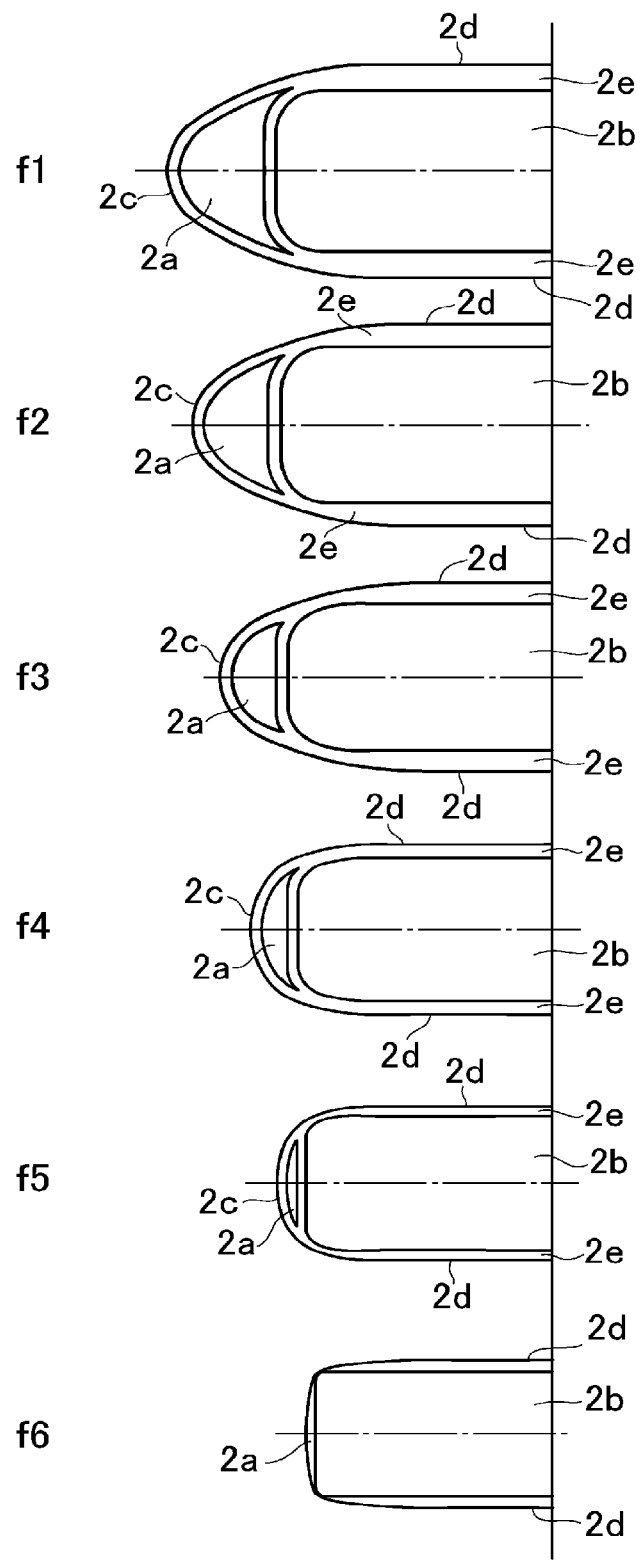
FIG. 8 is an explanatory illustration showing a change in a shape of the interim cup from step f1 to step f6 viewed from the bottom.

As a result of drawing and ironing the interim cup 2, the curved corners 2e formed below the long side walls 2d are narrowed gradually with a reduction in the inclined walls 2a, and eventually bent at a substantially right angle to be shaped into a corner between the bottom plate 1a and the long side wall 1b (or into a curved section at which a curvature is large and a curvature radius is short) of the rectangular can 1. That is, the curved corner 2e will also be eliminated eventually. Such deformations of the inclined wall 2a and the curved corner 2e viewed from the bottom are shown in FIG. 8. In the example shown in FIG. 8, the inclined wall 2a is almost eliminated at a step indicated as f6. In this situation, the ironing is mainly applied to the interim cup 2. Accordingly, the material flows in a moving direction (i.e., in the vertical direction) of the punch but rarely flows in the circumferential direction. Therefore, it is not necessary to distribute the forming force in the circumferential direction.

In the example shown in FIG. 2, the interim cup 2 is ironed at steps indicated as f7 and f8 to be shaped into the rectangular can 1, and upper ends of the side walls 2c and 2d are trimmed as necessary. Accordingly, the ironing executed in this situation corresponds to a third step.

As has been explained heretofore, according to the exemplary embodiment of the present invention, the plastic flow of the material in the circumferential direction is expedited by the inclined walls 2a during execution of the ironing in which a processing amount is large. Therefore, the forming force may be reduced (especially at an initial motion). In other words, a processing amount may be increased while preventing development of cracks and ruptures. That is, a processing efficiency and a productivity can be improved. In addition, according to the manufacturing method of the present invention, it is possible to reduce the factors to restrict or hinder the flow of the material in the vicinity of the short sides during execution of the ironing. Therefore, the rectangular can 1 may be formed efficiently without developing cracks and ruptures. That is, the rectangular can 1 may be formed highly accurately to improve the quality thereof. Furthermore, the interim cup 2 may be fitted onto the die in a stable manner and may be transported to the subsequent step in a stable manner. Therefore, it is possible to manufacture the rectangular can 1 efficiently while preventing a jamming so that the productivity is further improved.

The invention claimed is:

1. A manufacturing method of a rectangular battery can having a rectangular cross-section parallel to a bottom plate by drawing and ironing a blank of aluminum alloy, comprising:
   a first step of ironing the blank thereby forming an interim cup including
      an oval or a rectangular interim bottom whose area is larger than the bottom plate of the rectangular battery can,
      an inclined wall tilting obliquely upwardly that is formed continuously from each longitudinal end of the interim bottom,
      a short side wall that is formed continuously from the inclined wall, and
      a long side wall that is formed continuously from a curved corner formed on each lateral end of the interim bottom;
   a second step of drawing or drawing and ironing the interim cup thereby deforming the interim cup such that each boundary between the interim bottom and the inclined wall is gradually displaced toward a longitudinal end of the bottom plate of the rectangular battery can, and that a width of the interim bottom in a direction along a minor axis is adjusted to a width of the bottom plate of the rectangular battery can in a direction along a short side; and
   a third step of ironing or drawing and ironing the short side wall and the long side wall that is executed after the second step thereby thinning thicknesses of the short side wall and the long side wall,
   wherein the second step is executed to
      eliminate the inclined wall by bending the inclined wall at a right angle with respect to the bottom plate thereby shaping the inclined wall into a part of the short side wall, and
      eliminate the curved corner by bending the long side wall thereby shaping the curved corner into a corner bent at a right angle with respect to the bottom plate.

2. The manufacturing method of the rectangular battery can as claimed in claim 1,
   wherein the inclined wall of the interim cup is inclined at a predetermined angle from a line of origin extending closer to the short side wall than the longitudinal end of the bottom plate of the rectangular battery can,
   the line of origin extends closer to the short side wall than the longitudinal end of the bottom plate of the rectangular can, and closer to the longitudinal end of the bottom plate of the rectangular can than an intermediate portion between the longitudinal end of the bottom plate of the rectangular can and the short side wall,
   the predetermined angle falls within a range from 25 to 45 degrees, and
   the inclined wall is joined to the short side wall through a smooth curve.

3. The manufacturing method of the rectangular battery can as claimed in claim 1,
   wherein a length of the interim bottom in a direction along a major axis is longer than a length of the rectangular battery can in a direction along a long side, and
   the width of the interim bottom in the direction along the minor axis is wider than a width of the rectangular battery can in the direction along the short side.

4. The manufacturing method of the rectangular battery can as claimed in claim 2,
   wherein a length of the interim bottom in a direction along a major axis is longer than a length of the rectangular battery can in a direction along a long side, and
   the width of the interim bottom in the direction along the minor axis is wider than a width of the rectangular battery can in the direction along the short side.

\* \* \* \* \*